United States Patent [19]
Yee et al.

[11] 3,735,736
[45] May 29, 1973

[54] METHOD FOR GROWING EDIBLE AQUATIC ANIMALS ON A LARGE SCALE

[75] Inventors: William C. Yee, Oak Ridge, Tenn.; Perry R. Stout, Davis, Calif.

[73] Assignee: The United States of America as represented by the United States Atomic Energy Commission, Washington, D.C.

[22] Filed: Feb. 8, 1971

[21] Appl. No.: 113,534

[52] U.S. Cl. .................................... 119/2, 119/3
[51] Int. Cl. ...................................... A01k 61/00
[58] Field of Search ................................. 119/3, 2

[56] References Cited
UNITED STATES PATENTS

| | | | |
|---|---|---|---|
| 3,166,043 | 1/1965 | Castillo | 119/3 |
| 3,495,572 | 2/1970 | Groves | 119/3 |
| 405,713 | 6/1889 | Lugrin et al. | 119/3 |
| 2,944,513 | 7/1960 | Keely | 119/3 |
| 3,572,291 | 3/1971 | Cavanagh | 119/3 |
| 3,566,839 | 3/1971 | Hilble | 119/3 |
| 3,473,509 | 10/1969 | Miyamura | 119/2 |
| 3,477,406 | 11/1969 | Fujinaga | 119/2 |
| 3,658,034 | 4/1972 | Day et al. | 119/2 |

*Primary Examiner*—Hugh R. Chamblee
*Attorney*—Roland A. Anderson

[57] ABSTRACT

A continuous and large-scale method for growing batches of shrimp or other aquatic animal from an initial average unit weight to a desired average unit weight. As exemplified by the growing of shrimp, each batch of shrimp is grown to increasingly larger unit weights by sequential transfer through a series of continuous-flow, above-ambient-temperature ponds of increasingly larger batch dwell volume. The ponds are fed by a stream of water which is at above-ambient temperature by virtue of being derived at least in part from effluent water coolant from an industrial facility. A batch of shrimp to be grown is transferred into each of the ponds for approximately equal growth periods. In a preferred form of the method, the dwell volumes of the ponds are sized so that approximately the same animal weight density prevails in each pond at the end of the growth period associated with that pond.

8 Claims, 5 Drawing Figures

INVENTOR.
William C. Yee
Perry R. Stout

BY

ATTORNEY.

METHOD FOR GROWING EDIBLE AQUATIC ANIMALS ON A LARGE SCALE

BACKGROUND OF THE INVENTION

This invention was made in the course of, or under, a contract with the United States Atomic Energy Commission.

Intensive aquaculture has long been recognized as a potentially promising technique for growing large quantities of edible aquatic animals at low unit cost. The intensive culture of both marine and freshwater varieties of crustacea and fish has been widely investigated, and facilities are now in operation for cultivating some species—e.g., carp, trout, and shrimp—on a commercial scale.

In one form of aquaculture, often referred to as pond culture, a batch of the species of interest is grown from fry size to harvestable adult size in an unpartitioned, non-flowing pond. Carp and catfish often are grown in this manner. In another form of culture, water is directed down a long unpartitioned channel, or raceway, in which shrimp fry or the like are grown to adult size. In most instances, the water in the ponds or raceways is at a temperature which varies with the ambient temperature. In some instances, however, water at a substantially constant temperature is employed. For example, rainbow trout have been grown from juvenile to adult stage in an unpartitioned raceway into which a stream of spring water at essentially 60°F is directed. In another form of culture, aquatic animals such as catfish have been grown from fry size to harvestable adult size while confined in a single cage immersed in a pond or flowing stream.

Several experimental aquaculture facilities of the pond-culture type have been constructed in various parts of the world to investigate the possibilities of improving product yield (lbs/ft$^2$-yr) by utilizing the warm coolant water effluent from large industrial facilities, such as electrical-power generating plants. The effluent from such facilities normally is at a temperature above that of ambient waters (e.g., a lake, river, or ocean) and is available in large volumes on a year-round basis. It has been realized that the use of such effluents as an aquaculture growing medium offers the possibility of economical operation at near-optimum temperature throughout the entire culture period for the species of interest, despite day-to-day variations in the ambient temperature. Similarly, it has been realized that the use of such effluents might permit the growing medium to be maintained at the preferred operating temperature throughout the year, despite seasonal variations in the ambient temperature. In spite of the extensive interest in aquaculture and the obvious need for additional food sources, however, none of the known methods is a truly large-scale process characterized by high yield and highly efficient use of the growing medium.

Accordingly, it is an object of this invention to provide a novel method for the growth of a selected species of aquatic animals.

It is another object to provide a method for growing such species with a high yield.

Still another object is to provide a method for growing such species on a continuous basis and on a large scale.

It is another object to provide a method for growing such species whereby the growing medium is utilized with high efficiency.

Other objects of this invention will be made apparent in the following description and claims.

SUMMARY OF THE INVENTION

This invention is a method for growing a batch of a selected species of aquatic animal from an initial average unit weight to a desired average unit weight. The method comprises providing a series of above-ambient-temperature, continuous-flow growing ponds $p_1...p_n$ for respectively growing the batch to increasingly larger average unit weights. The ponds are fed by a stream of water which is at above-ambient temperature by virtue of being derived at least in part from effluent cooling water. The ponds $p_1...p_n$ constitute a progression with respect to dwell volume for the batch under growth. A batch of fry is introduced to the smallest-dwell-volume pond of said series and maintained therein for a selected period to increase the initial average unit weight thereof to a larger fraction of said desired weight. The batch so grown is sequentially transferred into each of the remaining ponds of the series to increase the average unit weight to the desired value. The batch then is recovered from the largest-dwell-volume pond of the series.

In a preferred form of the method, the batch sequentially transferred through ponds $p_1...p_n$ is maintained in each of the ponds for approximately the same time to grow the batch to selected average unit weights $w_1...w_n$, respectively, and the ponds $p_1...p_n$ are sized with animal dwell volumes which increase in approximately the same proportion as the weights $w_1...w_n$.

DESCRIPTION OF THE PREFERRED EMBODIMENT

The preferred form of our method will be illustrated in terms of a facility designed for growing juvenile saltwater shrimp (Penaeus setiferus) to harvestable adult shrimp on a year-round basis. The facility is designed to produce 5,000 tons of shrimp a year, which is equivalent to a product yield of about 10 tons/acre-year. Also, the facility is designed for a shrimp-culture period (fry to harvestable adults) of 26 weeks. As will be described, successive batches of shrimp at various stages of growth are moved sequentially through the facility at one-week intervals. Warm water is used as the growing medium to permit operation over extended periods at temperatures promoting high growth rates. Flowing water is employed in order to sweep away shrimp wastes and improve dissolved oxygen distribution, the linear flow rate of the water being made sufficiently high to sweep away such wastes but preferably low enough to permit the shrimp to maintain their typical bottom position with minimal expenditure of their food intake energy. The growing medium is provided in the form of series of ponds which are small enough to permit close control of process conditions.

The shrimp-growing facility is designed for a saltwater input of 1,000 Mgd (millions of gallons per day) at 80°F, and for a water temperature gradient across the facility of about 3°F (based on the linear flow rate specified below, a wind velocity of 10 mph, and a maximum temperature difference of 20°F between the water and the ambient atmosphere). The water linear flow rate for the facility is set at 30 ft/min, and the water residence time and depth are set at 6.7 hours and 3 feet, respectively. The water input is distributed over an area of 13,408 ft². The mass of shrimp supported per unit flow of water is 4 lb/gpm. These values are not new in themselves but are based on values used successfully in various shrimp-growing experiments known in the art.

As will be explained in more detail, the facility 1 is designed to be operated throughout the culture period with a substantially constant shrimp weight density, which in this example is approximately 0.24 lb/ft³ shrimp dwell volume. Shrimp are bottom-dwelling animals, and the term shrimp dwell volume is used herin to refer to a layer of water of unit height whose bottom surface corresponds to that of the container. For example, a pond having a depth of three feet and a bottom area of 100 ft² is referred to herein as having a shrimp dwell volume of 100 ft³.

Figure 1:
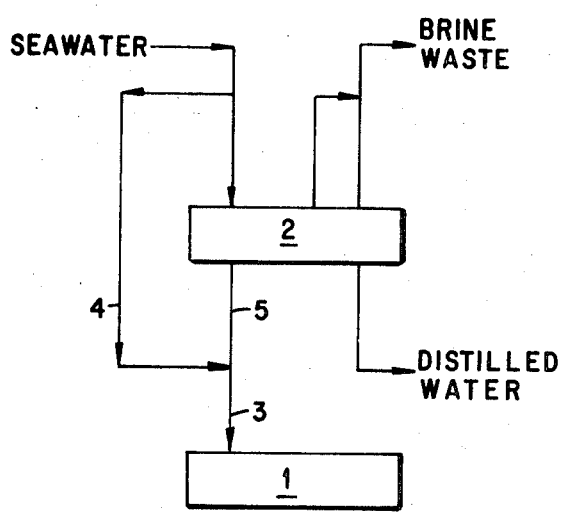
FIG. 1 is a schematic diagram illustrating an arrangement wherein above-ambient effluent coolant from a nuclear desalination plant is continuously blended with ambient-temperature seawater to form a warm-water input stream utilized in accordance with this invention.

Referring to FIG. 1, the shrimp-growing facility 1 is illustrated as situated adjacent to a coastal nuclear desalination plant 2, which in this example is one of the various conventional types utilizing salt water as a coolant. The 1,000 Mgd input stream 3 to the facility 1 is obtained by continuously blending a pumped stream 4 of seawater at ambient temperature with the desalination plant effluent stream 5 of evaporator coolant salt water. Typically, the effluent stream from this desalination plant is at a temperature which is 33°F above that of the seawater. The two saltwater streams are blended to provide the 80°F, 1,000 Mgd input to the facility. The proportions of the streams so blended are varied from time to time as required to compensate for seasonal variations in the temperature of the seawater.

Figure 2:
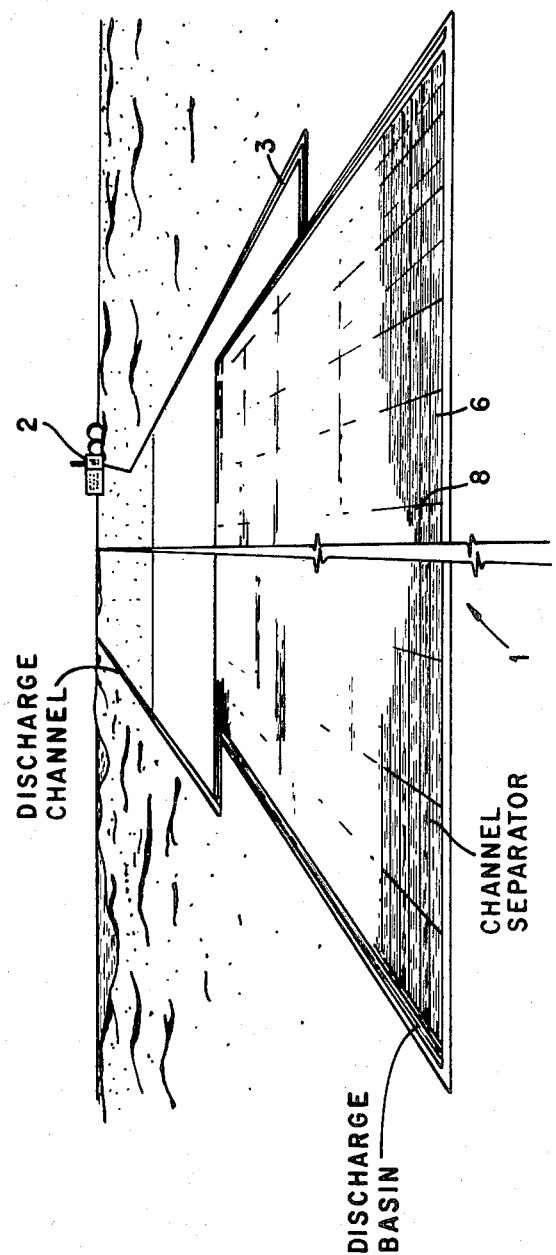
FIG. 2 is a perspective view of a nuclear-desalination and shrimp-growing complex.
Figure 4:
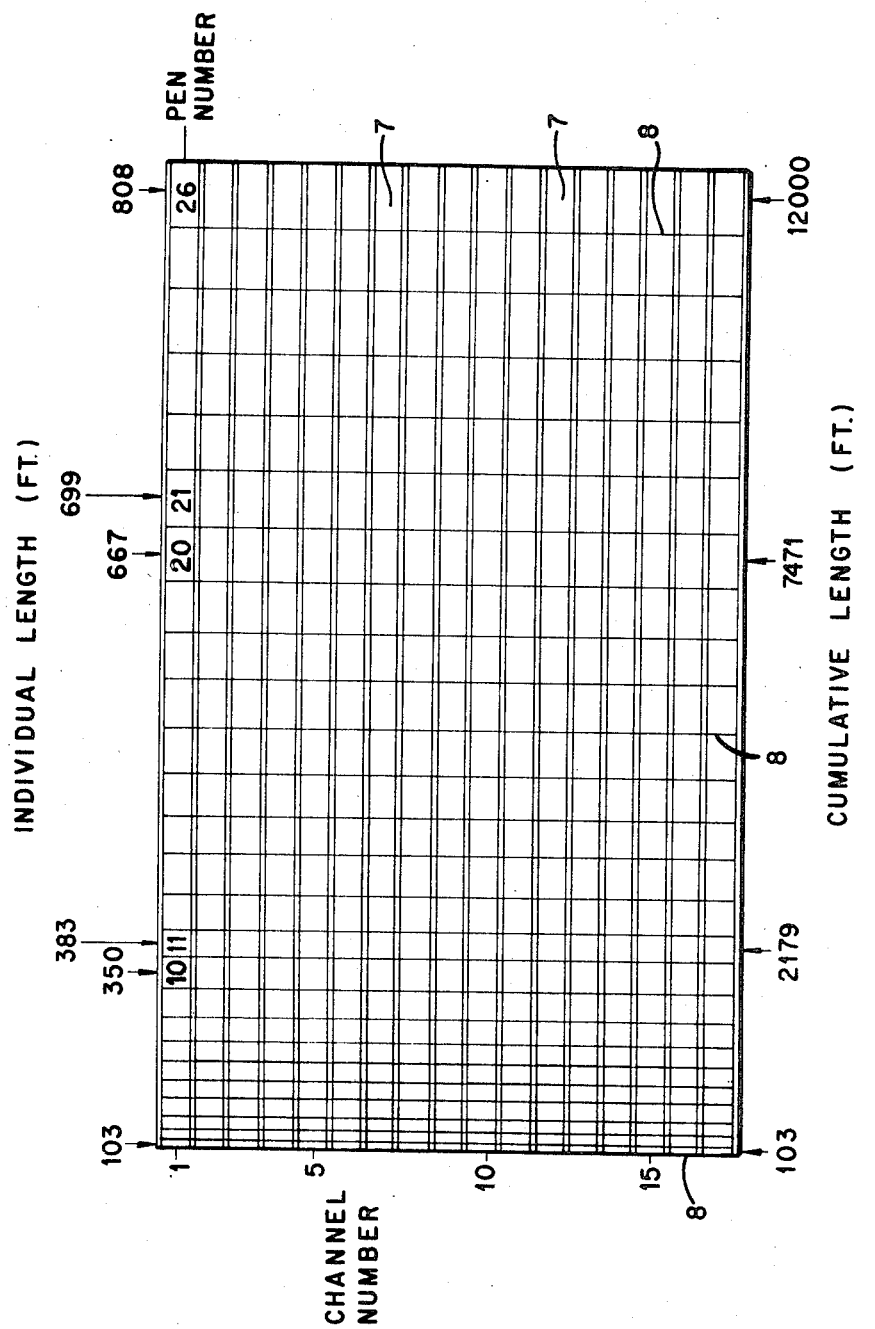
FIG. 4 is a schematic top view of a growing-pen arrangement designed in accordance with this invention.

Referring to FIGS. 2 and 4, the facility 1 comprises seventeen like concrete channels 6, or raceways, which are connected in parallel to receive equal fractions of the aforementioned saltwater input stream 3. Each channel is approximately 3.5 feet deep, 60 feet wide, and 12,000 feet long, and its bottom is covered with a 6-inch-thick layer of sand to permit the shrimp to burrow, as they tend to do during their periodic moulting stages of growth. To maintain the desired velocity of flow (30 ft/min), each channel is designed with a 10 percent slope toward the discharge end, and the wall at that end of the channel is designed with a height of 2.7 feet to permit continuous outflow. As indicated in FIG. 2, separators (access roadways) extend between adjacent channels.

As indicated in FIGS. 2 and 4, each of the channels 6 is partitioned into a series of shrimp-growing pens 7, or compartments, through which its associated saltwater stream flows continuously. As will be explained, conventional techniques are employed to maintain shrimp-growing conditions in each of the streams as it flows through its respective channel. Thus, each of the pens 7 serves as a growing pond, this term being used herein to refer to a body of water which is maintained under conditions satisfying the biological growth requirements of the species confined therein.

As indicated in FIG. 4, the partitioning of each channel is effected by means of 25 transversely extending, woven-wire screens 8 coated with corrosion-resistant material, such as polyvinyl chloride. Normally, each of the screens is in the position as indicated (FIG. 4), one of the screens being positioned adjacent to the inlet end of the channel. The screens partition the chanenl into 26 successive pens $p_1...p_{26}$ of increasing length, the shortest pen $p_1$ being at the input end of the channel.

The screens 8 normally extend to the bottom of the channels. Each of the screens is mounted to permit longitudinal movement thereof along the major axis of the channel for a distance approximating the length of its associated pen. Also, each screen is mounted to permit its being lifted vertically from its normal stationary position to a latched-in raised position where its lower edge clears the bottom of the channel by a selected amount. Thus, any one of the screens may be lifted or may be moved axially within its channel. Either type of movement of a screen may be effected by conventional means. For example, a conventional bridge crane spanning the channel and mounted on rails extending along either side thereof may be used to raise or lower a screen and to transport a lowered screen along the axis of the channel.

With the screens in normal lowered position, a batch of shrimp in pen $p_1$—i.e., in the pen bounded by the first and second screens—can be swept, or transferred, into the adjacent empty pen $p_2$ by lifting the second screen and slowly advancing the first screen close to the position normally occupied by the second. The second screen then is lowered to normal position to trap the shrimp so swept into pen $p_2$, after which the first screen is returned to its normal position. Another batch of shrimp then can be introduced to pen $p_1$. By operating adjacent screens in this manner, batches of shrimp can be transferred downstream sequentially into pens $p_1...p_{26}$. When desired, shrimp in the last pen $p_{26}$ can be swept into a collection zone in the outlet end thereof by advance of the 25th screen. In an alternative arrangement, the above-mentioned screen adjacent the inlet end of the channel is omitted and a similar screen is provided adjacent the outlet end of the channel. Downstream transfer of shrimp from a given pen to an adjacent empty pen then is accomplished as follows: the screen at the downstream end of the pen is lifted out of the shrimp dwell zone and conveyed, while lifted, to a position immediately downstream of the screen at the upstream end of the pen. The screen so conveyed then is dropped to the lowered position and slowly advanced to its original position, sweeping the shrimp into the empty pen. Shrimp transfer is best conducted at night, when the shrimp leave their burrows in the sandy bottom of the channel.

An important feature of the preferred form of this method is that it permits highly efficient utilization of the inventory of warm, flowing water and of the shrimp-dwell volumes. Thus, the channels 6 are designed for continuous operation, in the sense that all of the pens and dwell volumes are in substantially continuous use throughout the culture period. The growth of shrimp introduced to pen $p_1$ continues uninterrupted until the shrimp are recovered from the last pen of the series. It is preferable, from the standpoint of continuous operation, for the shrimp dwell periods in the pens of the channel to be made approximately the same, and the facility 1 is designed with a convenient dwell period of one week. That is, the batches of shrimp are transferred from pen to pen of a channel at approximately one-week intervals.

To provide still more efficient utilization of the growing medium, the channels 6 are designed to be operated in a manner maintaining a near-constant shrimp weight density throughout the 26-week culture period. As previously mentioned, shrimp weight density refers to lbs/ft$^3$ shrimp-dwell volume. To illustrate the manner in which a near-constant shrimp density is achieved, reference is first made to FIG. 3, which is a growth curve for 5-gram shrimp (Penaeus setiferus) grown in an ocean environment at temperatures in the range of 70° to 85°F. In designing the facility 1, the curve is considered to consist of an initial portion corresponding to a hatchery operation in which the shrimp attain an average unit weight of 5 grams. The remainder of the curve is utilized in the design of a channel for growing the 5-gram shrimp to adult size over a period of 26 weeks. Lines have been drawn from the axes to the curve to indicate the weight attained by the typical shrimp at the end of each weekly interval. For example, the line labeled "10" indicates that at the end of the 10th week the 5-gram shrimp have attained an average unit weight of about 20 grams. As shown in column 2 of the accompanying table, the weights ($w_1...w_n$) attained at the ends of the weekly periods do not increase in fixed proportion.

Still referring to the table, the facility 1 is designed for the culture of shrimp fry which have been grown, in a conventional hatchery operation, to an average unit weight $w$ of 5 g. A selected number, or batch, of such fry is introduced to pen $p_1$, where it is left for 1 week, during which period the shrimp grow to an average unit weight $w_1$ of 5.7 g. The batch then is transferred into pen $p_2$ by operation of the appropriate screens 8, as described. At the end of the week's residence in pen $p_2$, the average shrimp has grown to a weight $w_2$ of 6.7 g. The batch then is transferred into pen $p_3$, and so on.

As indicated in columns 3 and 4, respectively, the pens $p_1...p_{26}$ are designed with lengths, and therefore shrimp-dwell volumes, which increase in essentially the same proportion as the weights $w_1...w_{26}$. For example, the dwell volumes of pens $p_1$ and $p_2$ are in essentially the same ratio (6180/7380) as weights $w_1$ and $w_2$ (5.7/6.7). It will be found, by dividing the total weight of shrimp in pen $p_1$ at the end of one week (column 7) by the shrimp dwell volume for $p_1$ (column 4), that the shrimp in $p_1$ are grown to a weight density of 0.24 lb/ft$^3$ dwell volume. The weight density attained in each of the remaining pens $p_2...p_{26}$ is approximately the same. Thus, throughout the entire culture period, the shrimp are grown under weight-density conditions which much more closely approach a constant than is the case in single-pond culture. In other words, the shrimp-dwell volumes of the 26 pens are sized to provide a near-constant shrimp weight density throughout the culture period.

The maintenance of a near-constant shrimp weight density is important because it permits more efficient utilization of the growing medium and of the land area occupied by the facility. Furthermore, close control of this parameter—combined with close control of other parameters such as temperature, flow, dissolved oxygen concentration, and nutrient content—provides a consistent product yield and a consistent product quality from week to week.

As mentioned, the stream flowing through each of the channels 6 is maintained under shrimp-growing conditions by conventional techniques which have been used successfully in other modes of aquatic animal cultivation. If necessary, the input water is aerated to provide a suitable dissolved-oxygen concentration (e.g., ≈3–5 ppm salt water) meeting the metabolic oxygen requirements of the shrimp. Weighted porous plastic tubes are laid across the bottom of each pen to aerate the first 4,000 feet of channel length and thus vent ammonia wastes generated by the shrimp. Similar lines are laid across the remaining 8,400 feet of the channel to maintain the dissolved oxygen concentration in the suitable range. Because of heat losses, the water temperature decreases along the length of the channel, but for the channel dimensions and the flow rate cited, the temperature gradient is only about 3°F. It is known that the shrimp growth rate in sea water at about 80°F is nearly twice that obtained in sea water averaging a temperature of 69°F for the culture period.

The shrimp in the pens 6 are fed periodically with any suitable feed—such as vitamin-enriched pellets containing 75 percent fish meal, the balance being stickwater (a by-product of trash fish processing). A conversion ratio of about 3 lb dry feed fed/lb wet shrimp has been obtained. Feedings are scheduled to maximize food utilization.

Referring to the above-cited table, the following additional details are presented on the throughput of shrimp through a channel designed for sequential transfer and for maintenance of a substantially constant weight density. A first batch of 121,200 shrimp fry having an average unit weight of 5 g is introduced to pen $p_1$. At the end of 1 week, the fry have attained a weight $w_1$ of 5.7 g and are transferred by operation of the screens 8 into pen $p_2$. Upon completion of the transfer, a second and similar batch of fry is introduced to pen $p_1$. These operations are repeated at weekly intervals, all of the pens being loaded with shrimp by the beginning of the 26th week. At the end of the 26th week, the screen 8 in the last pen is moved toward the discharge end to permit recovery and harvesting of the 11,747 pounds of shrimp therein (column 7). The shrimp may be recovered from the channel by any suitable technique, as by means of a vacuum fish-and-water pump (see the periodical (The American Fish Farmer, Jan. 1971, pages 12–13).

Upon completion of the shrimp-recovery operation, the screen 8 is returned to its normal position and lifted to permit the shrimp in the adjacent upstream pen to be transferred into the last pen. Each of the batches in the remaining pens then is transferred downstream 1 pen, following which a batch of 5-gram fry is introduced to the now-empty pen $p_1$. The channel now is in a steady-state condition wherein shrimp are introduced and harvested at weekly intervals. Referring to steady-state operation of the entire 17-channel facility, the weekly input is 2.1 million fry, and the weekly output is 199,699 pounds of adult shrimp of average unit weight $w_{26}$. The facility can be operated indefinitely and continuously in the steady-state condition. The annual yield of a facility of this kind can also be expressed as about 5,000 tons for each 1,000 Mgd of flowing water at 80°F.

Figure 3:
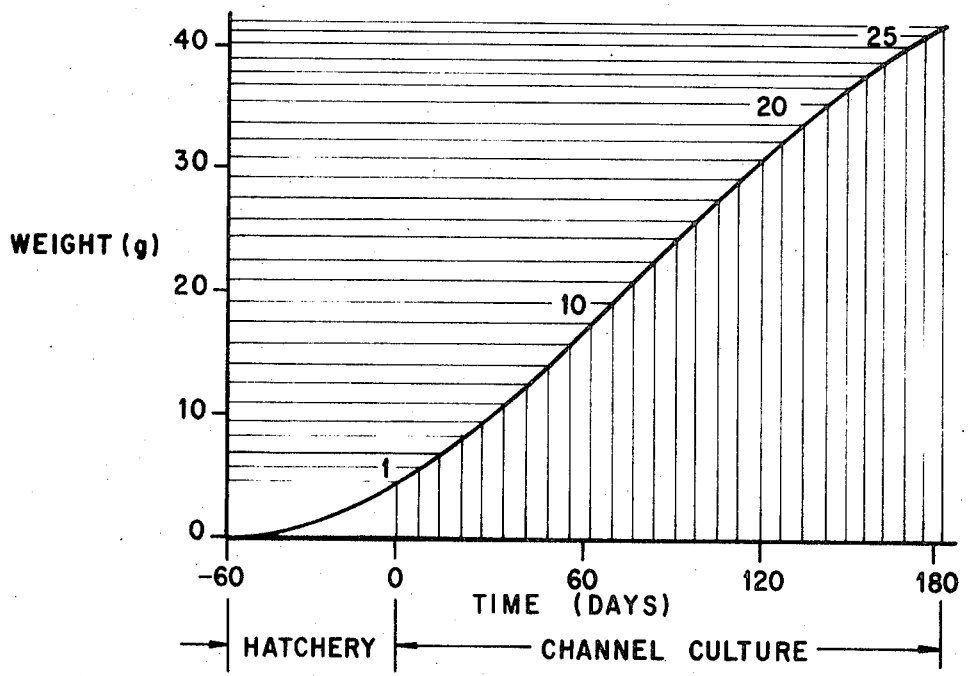
FIG. 3 is a growth curve for shrimp (Penaeus setiferus) grown in an ocean environment at a temperature in the range of from 70° to 85°F.

It will be understood that the facility described above and the figures listed in the associated table are presented only as an illustration of this invention. For example, the source of the effluent coolant water at above-ambient temperature may be any industrial installation; it need not be a nuclearly powered desalination plant nor a desalination plant. The mechanical arrangement for lifting and reciprocating the screenlike members 8 may, if desired, be similar to a conventional reciprocating sludge collector of the type having liftable scraper blades (Link-Belt Company, New York, N. Y.). Referring to the accompanying table, the selected average unit weight of the introduced fry may be any convenient value, as may be the selected dwell period. If desired, dwell periods in the various ponds of a series need not be approximately equal, but, as pointed out above, this is preferable for highly efficient continuous operation. Referring to FIG. 3, various growth curves appropriate to the species under culture can be used as a design guide.

Referring more generally to my invention as applied to the growth of marine animals, it will be apparent that both of the streams 4 and 5 (FIG. 1) which are blended to form the input stream to the facility need not be salt water. The above-ambient effluent may, for example, be non-saline coolant water, such as that discharged from many industrial plants, in which case the effluent is blended with salt water to provide an input stream at the desired temperature. Conversely, the input stream may be provided by blending effluent saltwater coolant with non-saline water derived, for example, from lake or river. It will also be apparent that in some instances it may be advisable to modify one or more of the streams 3, 4, 5 by the addition of substances (e.g., oxygen or salt) providing a more suitable growing medium or by removal of substances (e.g., copper or mercury) impairing suitability of the growing medium. Also, continuous-flow holding ponds may be used to adjust the temperature of either or both of the above-ambient streams. In some circumstances, such as where a large volume of effluent saltwater coolant is available at a temperature close to that desired for the series of above-ambient, continuous-flow growing ponds, it may be preferred to derive the input stream 3 solely from the above-ambient effluent coolant.

It will also be apparent that the mode of operation described herein is not limited to the use of a particular plurality of continuous-flow, warm-water pens proportioned as described. A batch of shrimp may be grown in accordance with this method by sequential transfer into a series of an indefinite number of pens, designated herein as pens $p_1...p_n$.

Figure 5:
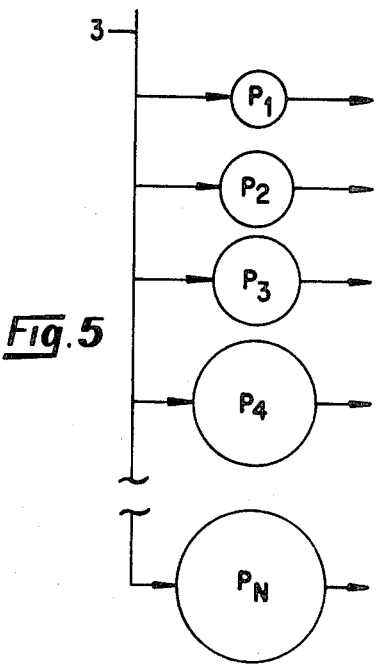
FIG. 5 is a schematic diagram of an alternative form of growing-pen arrangement.

As illustrated in FIG. 5, our method also can be conducted in a facility where the function of the pens $p_1...p_n$ is served by a series of discrete, above-ambient-temperature, continuous-flow ponds of increasing dwell volume. In the form shown in FIG. 5, the ponds are connected in parallel with respect to the input stream 3. The batch of aquatic animals under culture is transferred sequentially through the series of ponds $p_1...p_n$, the dwell periods in the ponds preferably being about equal. The animals in a given pond may be swept into a collection zone therein by any suitable means, such as a screen, grid, or perforated plate moved slowly through the pond by a bridge crane or other suitable drive means. Transfer from pond to pond is accomplished by a vacuum fish pump or any other suitable means. The ponds may be of a type sometimes used in single-pond fish culture, this type of pond being one where the water is introduced tangentially to spiral inward to a central withdrawal sump. In a somewhat different arrangement, the ponds of the series may comprise spaced rectangular ponds which are connected in series or in parallel to receive water from the input stream 3. For convenience, the word "pond" is used in the appended claims to refer not only to pools and the like but to penned water, such as water in a pen 7 of the kind described above.

Our invention has been illustrated above in terms of the growth of saltwater shrimp, but it is applicable also to the growth of various other marine crustacae, such as lobsters and crabs. Likewise, it is applicable to freshwater crustacae, such as shrimp and crayfish, in which case the input stream 3 is derived wholly or in part from freshwater effluent coolant.

The method described herein is not limited to bottom-dwelling species but is applicable to the growth of marine and saltwater fish—as, for example, catfish, trout, yellowtail, and sole. In that application, the entire volume of a pond constitutes its dwell volume. Conventional technology may be employed to satisfy the growth requirements of the fish under culture.

TABLE

| Pen No. | Weight of individual shrimp (g.) | Length of each pen (ft.) | Dwell volume each pen (ft.³) | Total pen area for 17 channels | | Total shrimp weight in each pen (lb.) | Total shrimp weight (lb.) |
|---|---|---|---|---|---|---|---|
| | | | | Ft.² | Acres | | |
| p1 | w1 | 5.7 | 103 | 6,180 | 105,060 | 2.41 | 1,497 | 25,449 |
| p2 | w2 | 6.7 | 123 | 7,380 | 125,460 | 2.88 | 1,788 | 30,396 |
| p3 | w3 | 8.1 | 149 | 8,940 | 151,980 | 3.49 | 2,166 | 36,822 |
| p4 | w4 | 9.5 | 173 | 10,380 | 176,460 | 4.05 | 2,515 | 42,755 |
| p5 | w5 | 11.0 | 198 | 11,880 | 201,960 | 4.64 | 2,879 | 48,943 |
| p6 | w6 | 12.5 | 224 | 13,440 | 228,480 | 5.25 | 3,257 | 55,369 |
| p7 | w7 | 14.0 | 255 | 15,300 | 260,100 | 5.97 | 3,707 | 63,019 |
| p8 | w8 | 15.6 | 288 | 17,280 | 293,760 | 6.74 | 4,187 | 71,179 |
| p9 | w9 | 17.5 | 316 | 18,960 | 322,320 | 7.40 | 4,592 | 78,098 |
| p10 | w10 | 19.0 | 350 | 21,000 | 357,000 | 8.20 | 5,088 | 86,496 |
| p11 | w11 | 20.6 | 383 | 22,980 | 390,660 | 8.97 | 5,568 | 94,656 |
| p12 | w12 | 22.5 | 416 | 24,960 | 424,320 | 9.74 | 6,048 | 102,816 |
| p13 | w13 | 24.1 | 449 | 26,940 | 457,980 | 10.51 | 6,528 | 110,976 |
| p14 | w14 | 25.7 | 480 | 28,800 | 489,600 | 11.24 | 6,978 | 118,626 |
| p15 | w15 | 27.6 | 519 | 31,140 | 529,380 | 12.15 | 7,545 | 128,265 |
| p16 | w16 | 29.2 | 547 | 32,820 | 557,940 | 12.81 | 7,952 | 135,184 |
| p17 | w17 | 30.8 | 581 | 34,860 | 592,620 | 13.60 | 8,447 | 143,599 |
| p18 | w18 | 32.5 | 609 | 36,540 | 621,180 | 14.26 | 8,854 | 150,518 |
| p19 | w19 | 34.0 | 641 | 38,460 | 653,820 | 15.01 | 7,319 | 158,423 |
| p20 | w20 | 35.5 | 667 | 40,020 | 680,340 | 15.62 | 9,697 | 164,849 |
| p21 | w21 | 36.7 | 699 | 41,940 | 712,980 | 16.37 | 10,162 | 172,754 |
| p22 | w22 | 38.0 | 723 | 43,380 | 737,460 | 16.93 | 10,511 | 178,687 |
| p23 | w23 | 39.1 | 747 | 44,820 | 761,940 | 17.49 | 10,860 | 184,620 |
| p24 | w24 | 40.2 | 766 | 45,960 | 781,320 | 17.94 | 11,136 | 189,312 |
| p25 | w25 | 41.3 | 786 | 47,160 | 801,720 | 18.40 | 11,427 | 194,259 |
| p26 | w26 | 42.5 | 808 | 48,480 | 824,160 | 18.92 | 11,747 | 199,699 |
| Total | | | 12,000 | 720,000 | | 280.99 | 174,457 | 2,965,769 |

What is claimed is:

1. In the growing of the members of a batch of a selected species of aquatic animal from an initial average unit weight $w$ to a desired average unit weight $w_n$, said species being confined in a body of water maintained under conditions meeting the biological growth requirements thereof, the improvement comprising:
   a. on a growth curve for said species selecting first and second points corresponding respectively to said initial average unit weight $w$ and said desired average unit weight $w_n$;
   b. subdividing that part of said curve between said points into periods of equal time $t$ to determine the unit weights $w_1...w_n$ attained by the ends of said periods;
   c. providing a series of above-ambient-temperature, continuous-flow ponds $p_1...p_n$ whose respective dwell volumes for said species increase in substantially the same proportion as said weights $w_1...w_n$, said ponds being fed by a stream of water which is at above-ambient temperature by virtue of being derived at least in part from effluent coolant water at above-ambient temperature;
   d. introducing said batch into the smallest-dwell-volume pond $p_1$ of said series of ponds and maintaining it therein for said time to grow the same from said initial weight $w$ to said weight $w_1$;
   e. sequentially transferring the batch so grown into each of the remaining ponds $p_2...p_n$ for said time $t$ to respectively increase the average unit weight of said batch to the values $w_2...w_n$; and
   f. recovering said batch from the largest-dwell-volume pond $p_n$ of said series.

2. The method of claim 1 wherein said stream of water is salt water.

3. The method of claim 1 wherein said stream is fresh water.

4. The method of claim 1 wherein said stream is formed by blending effluent coolant water at above-ambient temperature with water at substantially ambient temperature.

5. The method of claim 1 wherein said effluent coolant water is derived from a desalination plant.

6. The method of claim 1 wherein said ponds are connected in parallel with respect to said stream.

7. The method of claim 1 wherein said series of ponds is formed by directing said stream of water through a raceway partitioned by a plurality of transversely disposed screenlike members.

8. The method of claim 7 wherein said members are movable along the major axis of said raceway.

* * * * *